(12) United States Patent
Arai et al.

(10) Patent No.: US 12,330,742 B2
(45) Date of Patent: Jun. 17, 2025

(54) TRANSMISSION APPARATUS

(71) Applicant: HONDA MOTOR CO., LTD., Tokyo (JP)

(72) Inventors: Dai Arai, Tokyo (JP); Asuka Ito, Tokyo (JP); Shinji Misawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/691,079

(22) PCT Filed: Sep. 29, 2021

(86) PCT No.: PCT/JP2021/036002
§ 371 (c)(1),
(2) Date: Mar. 12, 2024

(87) PCT Pub. No.: WO2023/053306
PCT Pub. Date: Apr. 6, 2023

(65) Prior Publication Data
US 2024/0375751 A1 Nov. 14, 2024

(51) Int. Cl.
*B62M 25/00* (2006.01)
*B62M 25/02* (2006.01)

(52) U.S. Cl.
CPC ....... *B62M 25/02* (2013.01); *B62M 2025/006* (2013.01)

(58) Field of Classification Search
CPC .... B62M 25/02; B62M 25/006; B62M 25/06; B62K 23/00; F16H 2057/02065; F16H 63/18
See application file for complete search history.

(56) References Cited

U.S. PATENT DOCUMENTS

| 7,176,643 | B2 | 2/2007 | Yamada et al. |
| 7,963,183 | B2 * | 6/2011 | Pick ........................ F16H 63/18 |
| | | | 74/337 |
| 9,481,372 | B2 * | 11/2016 | Ono ........................ F16H 63/50 |
| 9,945,477 | B2 * | 4/2018 | Nakamura .............. F16H 63/16 |

(Continued)

FOREIGN PATENT DOCUMENTS

| JP | 2006-136035 A | 5/2006 |
| JP | 2016-070357 A | 5/2016 |
| JP | 2016-191460 A | 11/2016 |

OTHER PUBLICATIONS

The extended European search report dated Sep. 25, 2024 issued in the corresponding EP Patent Application No. 21959348.0.

*Primary Examiner* — Zakaria Elahmadi
(74) *Attorney, Agent, or Firm* — Carrier, Shenda & Associates P.C.; Joseph P. Carrier; Fulchand P. Shende

(57) ABSTRACT

A control value is corrected and learned based on a difference angle $\Delta\varphi$ between a drum shaft conversion spindle integration angle $\varphi s$ obtained by converting a detected spindle angle detected by a spindle angle sensor 78 into a drum angle and a detected drum angle $\varphi d$ detected by a drum angle sensor 89, over a predetermined learning time T from when the shift motor 61 is driven, and a drive engagement portion 83*d* of a shift driven gear 83 reduces the play angle to abut on a driven engagement portion 82*d* of a drum center 82 to accompany the driven engagement portion 82*d*. In this manner, rotation of a shift drum 80 can be accurately controlled by the shift motor 61, while the number of components of a variable speed drive mechanism 60 is reduced.

5 Claims, 13 Drawing Sheets

(56) References Cited

U.S. PATENT DOCUMENTS

| | | | |
|---|---|---|---|
| 10,190,678 B2* | 1/2019 | Nakamura | F16H 61/0213 |
| 11,293,527 B2* | 4/2022 | Kittaka | F16H 3/089 |
| 11,415,219 B2* | 8/2022 | Sano | F16H 63/18 |
| 2015/0000448 A1* | 1/2015 | Tetsuka | F16H 63/18 |
| | | | 74/473.12 |
| 2015/0006042 A1* | 1/2015 | Hotei | F16H 63/18 |
| | | | 701/51 |
| 2016/0091089 A1* | 3/2016 | Nakamura | F16H 63/16 |
| | | | 74/337.5 |
| 2016/0288879 A1* | 10/2016 | Ono | F16H 63/18 |
| 2016/0290442 A1* | 10/2016 | Adachi | F16H 63/18 |
| 2018/0086418 A1* | 3/2018 | Tokito | B62M 25/08 |
| 2019/0093765 A1* | 3/2019 | Kubota | F16H 59/68 |
| 2020/0256400 A1* | 8/2020 | Yanagida | H04L 45/48 |
| 2022/0034400 A1* | 2/2022 | Miller | F16H 63/304 |

* cited by examiner

TRANSMISSION APPARATUS

TECHNICAL FIELD

The present invention relates to a transmission apparatus that changes a transmission gear ratio of a transmission by driving a shift motor and rotating a shift drum.

BACKGROUND ART

Patent Document 1 discloses an example of a transmission apparatus that accurately detects a rotation angle of a shift drum.

PRIOR ART DOCUMENT

Patent Document

Patent Document 1: JP 2016-70357 A

The transmission apparatus disclosed in Patent Document 1 includes a dual-clutch transmission, and a variable speed drive mechanism that shifts the transmission changes and shifts a gear pair that transmits power of the transmission by the movement of a shift fork guided to a shift drum when the shift drum is rotated by driving a shift motor.

When the shift motor is driven, a shift spindle is rotated via a reduction gear mechanism, and a pole ratchet mechanism intermittently rotates the shift drum by the rotation of a master arm integrated with the shift spindle.

In a transmission apparatus including a dual-clutch transmission, when many shift stages are set, the number of gear positions of the shift drum is further increased, and intervals between the gear positions become narrower.

As gear position intervals of the shift drum become narrower, it is required to accurately control the rotation of the shift drum, and for this purpose, it is necessary to accurately detect a rotation angle of the shift drum.

In this respect, a shift drum angle detection device in the transmission apparatus according to Patent Document 1 includes a first angle sensor (corresponding to a drum angle sensor) that detects a rotation angle of a first sensor shaft integrated with the shift drum, and particularly includes a second angle sensor that detects a rotation angle of a second sensor shaft subjected to a speed increase of the rotation of the first sensor shaft via a speed increasing mechanism, thereby accurately detecting the rotation angle of the shift drum by using the rotation angles detected by each of the first angle sensor and the second angle sensor.

SUMMARY OF THE INVENTION

Underlying Problems to be Solved by the Invention

The transmission apparatus disclosed in Patent Document 1 includes the pole ratchet mechanism to rotate the shift drum, and newly includes the speed increasing mechanism and the second sensor shaft in addition to the first angle sensor corresponding to the drum angle sensor in order to accurately detect the rotation angle of the shift drum, such that the second angle sensor detects the rotation angle of the second sensor shaft.

As described above, in Patent Document 1, the number of components such as the pole ratchet mechanism in the variable speed drive mechanism is large, and a complicated structure is configured. In this manner, the speed increasing mechanism and the second sensor shaft for detecting the rotation angle of the shift drum are further provided, thereby, further increasing the number of components and increasing costs.

The present invention has been made in view of such points, and an object of the present invention is to provide, at a low cost, a transmission apparatus that accurately controls rotation of a shift drum by a shift motor while decreasing the number of components of a variable speed drive mechanism.

Means to Solve the Problems

In order to achieve the above object, the present invention provides a transmission apparatus including: a transmission including a gear pair having different transmission gear ratios for transmitting power; and a variable speed drive mechanism that changes and shifts the gear pair that transmits power of the transmission by movement of a shift fork guided to a shift drum when the shift drum is rotated by being driven by a shift motor, in which the variable speed drive mechanism includes a drum center that is provided at an end portion of the shift drum and is rotated together with the shift drum, a stopper mechanism that positions the drum center at an angular position of each gear position, a shift driven gear that is rotated in synchronization with the shift motor and is disposed to be engageable with the drum center, a shift spindle that is rotated in synchronization with the shift motor and integrally has a shift drive gear that meshes with the shift driven gear at a predetermined reduction ratio, and a configuration in which a drive engagement portion formed in the shift driven gear and a driven engagement portion formed in the drum center are engageable with each other in a circumferential direction with a play angle between the drive engagement portion and the driven engagement portion in the circumferential direction, the variable speed drive mechanism including a drum angle sensor that detects a rotation angle of the shift drum, a spindle angle sensor that detects a rotation angle of the shift spindle, and a shift control device that controls driving of the shift motor based on a control value for rotating the shift driven gear to a target position, and the shift control device corrects and learns the control value based on a difference angle between a drum shaft conversion spindle integration angle obtained by converting a detected spindle angle detected by the spindle angle sensor into a drum angle and a detected drum angle detected by the drum angle sensor, over a predetermined learning time from when the shift motor is driven, and the drive engagement portion of the shift driven gear reduces the play angle to abut on the driven engagement portion of the drum center to accompany the driven engagement portion.

According to this configuration, the variable speed drive mechanism is provided in which the shift drive gear provided integrally to the shift spindle that is rotated in synchronization with the shift motor meshes with the shift driven gear at the predetermined reduction ratio, and the drum center that is rotated by loosely being fitted in the shift driven gear in the circumferential direction rotates the shift drum integrally. Hence, the pole ratchet mechanism and the like can be eliminated to reduce the number of components and simplify the structure, the spindle angle sensor only needs to detect the rotation angle of the shift spindle, and there is no need to provide a mechanism for another angle sensor. Hence, the number of components can be further reduced to achieve a simple structure and cost reduction.

In addition, the shift control device learns the difference angle between the drum shaft conversion spindle integration angle obtained by converting the detected spindle angle into the drum angle and the detected drum angle, over the predetermined learning time from when the shift motor is driven, and the drive engagement portion of the shift driven gear reduces the play angle to abut on the driven engagement portion of the drum center to accompany the driven engagement portion such that the difference angle is maintained as a constant value. Hence, it can be estimated that the difference angle between the drum shaft conversion spindle integration angle and the detected drum angle reflects deviation between the drum center and the shift driven gear when the drum center is set at the gear position, the difference angle being obtained when it is clear that a relative positional relationship between the drum center and the shift driven gear is a relative positional relationship in which the drive engagement portion and the driven engagement portion are in contact with each other. In addition, the control value of the shift motor is corrected and learned based on the difference angle, and thereby the deviation between the drum center and the shift driven gear is corrected to accurately control the rotation of the shift drum by the shift motor.

In a preferred embodiment of the present invention,
the shift control device performs
learning of the difference angle between the drum shaft conversion spindle integration angle and the detected drum angle, over a predetermined learning time from a stopped state after the shift motor is further driven in a shift-up direction when the transmission is set in a top gear state, and the drive engagement portion of the shift driven gear reduces the play angle to abut on the driven engagement portion of the drum center to accompany the driven engagement portion.

According to this configuration, the stopped state after the shift motor is further driven in the shift-up direction when the transmission is set in the top gear state, and the drive engagement portion of the shift driven gear reduces the play angle to abut on the driven engagement portion of the drum center to accompany the driven engagement portion is stable, with the drum center entering a fixed state. Hence, the fixed state of the drum center can be easily set, and the difference angle between the drum shaft conversion spindle integration angle and the detected drum angle can be accurately learned.

When the transmission is set in the top gear state, the shift motor is further driven in the shift-up direction, and the difference angle between the drum shaft conversion spindle integration angle and the detected drum angle is learned, so that the learning can be performed with little influence on shifting work.

In the preferred embodiment of the present invention,
the shift control device performs
learning of the difference angle between the drum shaft conversion spindle integration angle and the detected drum angle, over a predetermined learning time from a stopped state after the shift motor is further driven in a shift-down direction when the transmission is set in a neutral state, and the drive engagement portion of the shift driven gear reduces the play angle to abut on the driven engagement portion of the drum center to accompany the driven engagement portion.

According to this configuration, the stopped state after the shift motor is further driven in the shift-down direction when the transmission is set in the neutral state, and the drive engagement portion of the shift driven gear reduces the play angle to abut on the driven engagement portion of the drum center to accompany the driven engagement portion is stable, with the drum center entering a fixed state. Hence, the fixed state of the drum center can be easily set, and the difference angle between the drum shaft conversion spindle integration angle and the detected drum angle can be accurately learned.

When the transmission is set in the neutral state, the shift motor is further driven in the shift-down direction, and the difference angle between the drum shaft conversion spindle integration angle and the detected drum angle is learned, so that the learning can be performed with little influence on shifting work.

In the preferred embodiment of the present invention,
the shift control device performs
learning of the difference angle between the drum shaft conversion spindle integration angle and the detected drum angle, over a predetermined learning time from a stopped state after the shift motor is further driven in a shift-up direction when the transmission is set in a top gear state, and the drive engagement portion of the shift driven gear reduces the play angle to abut on the driven engagement portion of the drum center to accompany the driven engagement portion,
learning of the difference angle between the drum shaft conversion spindle integration angle and the detected drum angle, over a predetermined learning time from a stopped state after the shift motor is further driven in a shift-down direction when the transmission is set in a neutral state, and the drive engagement portion of the shift driven gear reduces the play angle to abut on the driven engagement portion of the drum center to accompany the driven engagement portion, and
correcting of the drum shaft conversion spindle integration angle based on an average of difference angles obtained by averaging the difference angle learned at the time of shift-up from the top gear state and the difference angle learned at the time of shift-down from the neutral state, and learning of the difference angle between the corrected drum shaft conversion spindle integration angle and the detected drum angle detected by the drum angle sensor.

According to this configuration, the average of the difference angles obtained by averaging the difference angle learned at the time of shift-up from the top gear state and the difference angle learned at the time of shift-down from the neutral state can be subtracted from the detected spindle angle to correct the drum shaft conversion spindle integration angle based on the corrected detected spindle angle, and the difference angle between the drum shaft conversion spindle integration angle and the detected drum angle can be learned with higher accuracy by using the corrected drum shaft conversion spindle integration angle.

In the preferred embodiment of the present invention,
the shift control device performs
learning of the difference angle between the drum shaft conversion spindle integration angle and the detected drum angle, over a predetermined learning time from a stopped state after the shift motor is driven to shift the transmission, and the drive engagement portion of the shift driven gear reduces the play angle to abut on the driven engagement portion of the drum center to accompany the driven engagement portion.

According to this configuration, when the shift motor is driven to shift the transmission, the stopped state after the drive engagement portion of the shift driven gear reduces the play angle to abut on the driven engagement portion of the drum center to accompany the driven engagement portion is maintained until the shifting is completed. Hence, the difference angle between the drum shaft conversion spindle integration angle and the detected drum angle can be learned over a predetermined learning time from the stopped state, and the difference angle between the drum shaft conversion spindle integration angle and the detected drum angle can be accurately learned while the drum center is in the stopped state.

Effects of the Invention

According to the present invention, the variable speed drive mechanism is provided in which the shift drive gear provided integrally to the shift spindle that is rotated in synchronization with the shift motor meshes with the shift driven gear at the predetermined reduction ratio, and the drum center that is rotated by loosely being fitted in the shift driven gear in the circumferential direction rotates the shift drum integrally. Hence, the number of components can be reduced to simplify the structure, and further, the spindle angle sensor only needs to detect the rotation angle of the existing shift spindle, and thus the number of components can be further reduced to achieve a simple structure.

In addition, the shift control device learns the difference angle between the drum shaft conversion spindle integration angle obtained by converting the detected spindle angle into the drum angle and the detected drum angle, over the predetermined learning time from when the shift motor is driven, and the drive engagement portion of the shift driven gear reduces the play angle to abut on the driven engagement portion of the drum center to accompany the driven engagement portion such that the difference angle is maintained as a constant value. Hence, it can be estimated that the difference angle between the drum shaft conversion spindle integration angle and the detected drum angle reflects deviation between the drum center and the shift driven gear when the drum center is set at the gear position, the difference angle being obtained when it is clear that a relative positional relationship between the drum center and the shift driven gear is a relative positional relationship in which the drive engagement portion and the driven engagement portion are in contact with each other. In addition, the control value of the shift motor is corrected and learned based on the difference angle, and thereby the deviation between the drum center and the shift driven gear is corrected to accurately drive the shift motor.

MODE FOR CARRYING OUT THE INVENTION

Hereinafter, an embodiment according to the present invention will be described with reference to FIGS. 1 to 16.

Figure 1:
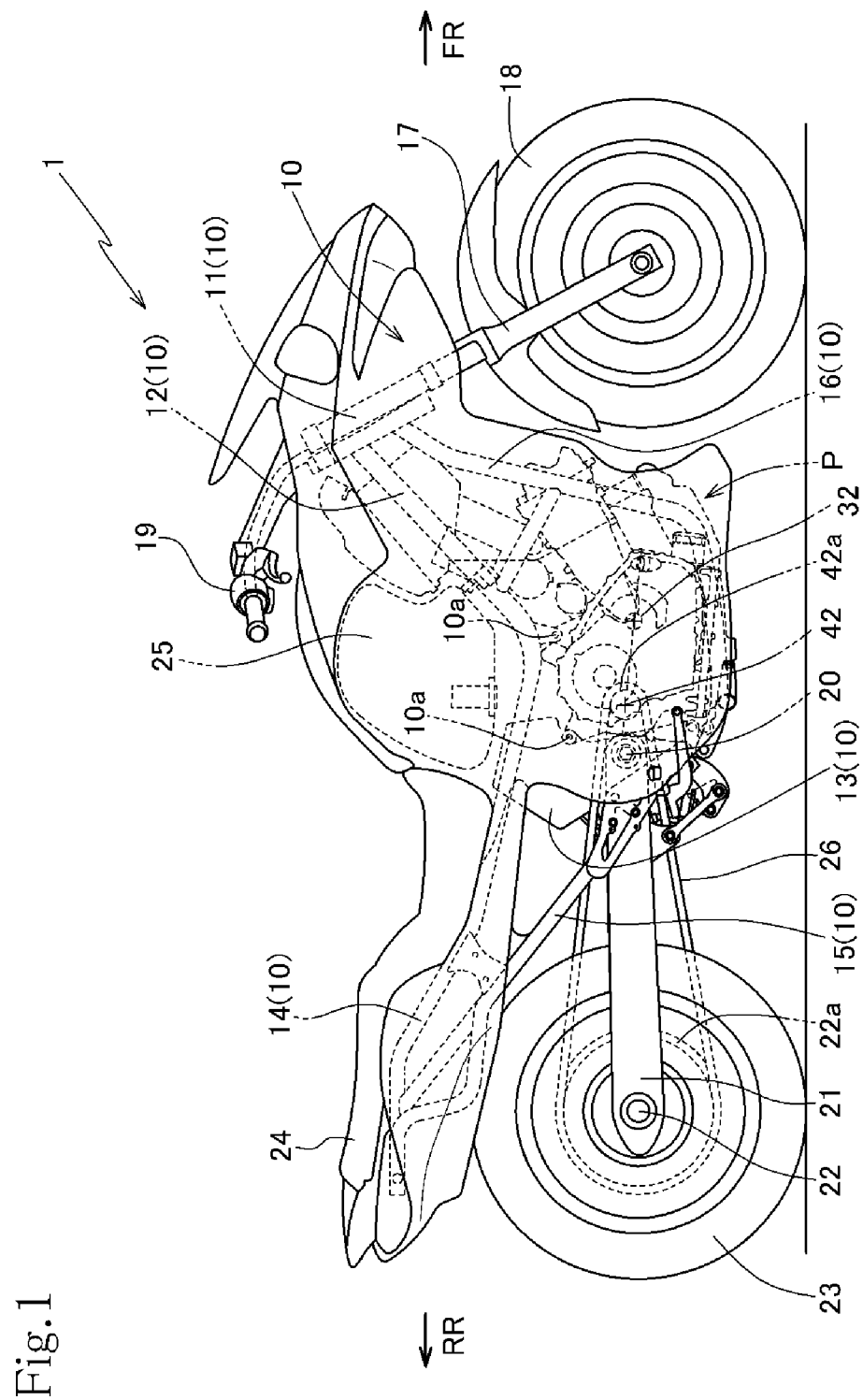
FIG. 1 is a right side view of a motorcycle equipped with a power unit according to an embodiment of the present invention.

FIG. 1 is a side view of a motorcycle 1 that is a saddle-type vehicle equipped with a power unit according to an embodiment to which the present invention is applied.

In the description of the present specification, the front, rear, left, and right directions are in accordance with a normal standard in which a straight traveling direction of the motorcycle 1 according to the present embodiment is the front, and in the drawings, FR indicates the front, RR indicates the rear, LH indicates the left, and RH indicates the right.

As illustrated in FIG. 1, a vehicle body frame 10 of the motorcycle 1 includes a head pipe 11 disposed in a front portion, a main frame 12 that extends rearward and obliquely downward from the head pipe 11 and is curved halfway to extend rearward, a center frame 13 extending downward from a rear end of the main frame 12, a seat rail 14 extending rearward from an upper portion of the center frame 13, a mid-stay 15 bridging a space between a rear portion of the center frame 13 and a rear portion of the seat rail 14, and a down frame 16 extending downward from the head pipe 11.

The head pipe 11 steerably supports a front fork 17 that rotatably supports a front wheel 18 at a lower end portion.

A steering handlebar 19 is connected to an upper end portion of the front fork 17. A swing arm 21 is swingably supported by the center frame 13 via a pivot shaft 20.

A rear wheel 23 is rotatably supported by a rear end of the swing arm 21 via a rear wheel axle 22.

An occupant seat 24 is attached above the seat rail 14, and a fuel tank 25 is mounted in front of the occupant seat 24 and above the main frame 12.

In the motorcycle 1, the power unit P that drives the rear wheel 23 is supported by a plurality of mounting brackets 10a provided on the vehicle body frame 10 and is mounted horizontally with a rotation axis of a crankshaft 32 directed in a right-left vehicle body width direction.

Figure 3:
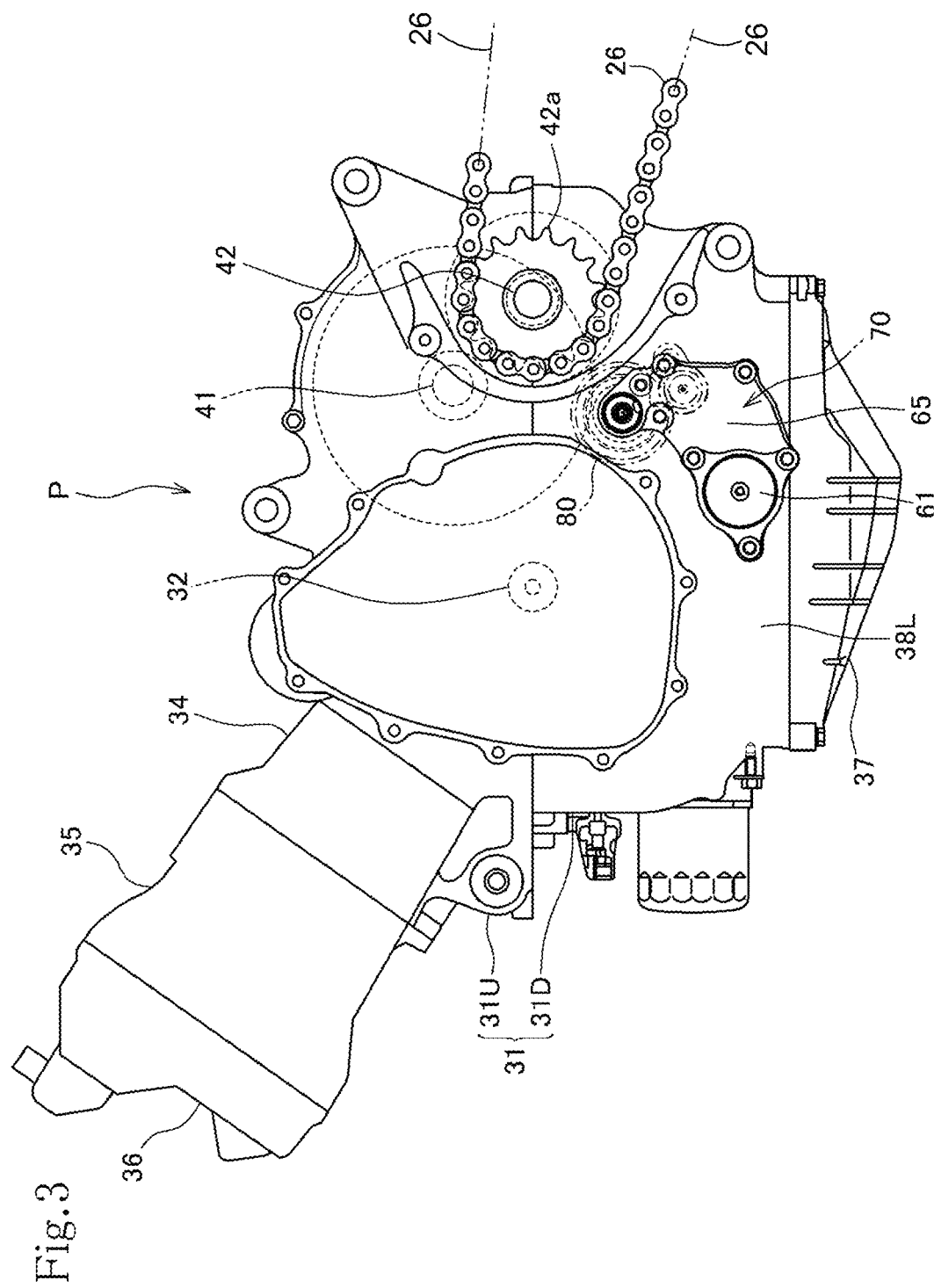
FIG. 3 is a left side view of the power unit.

An endless chain 26 bridges a space between a drive sprocket 42a fit-attached to an output shaft (counter shaft 42) of the power unit P and a driven sprocket 22a fit-attached to the rear wheel axle 22 (see FIG. 3).

Figure 2:
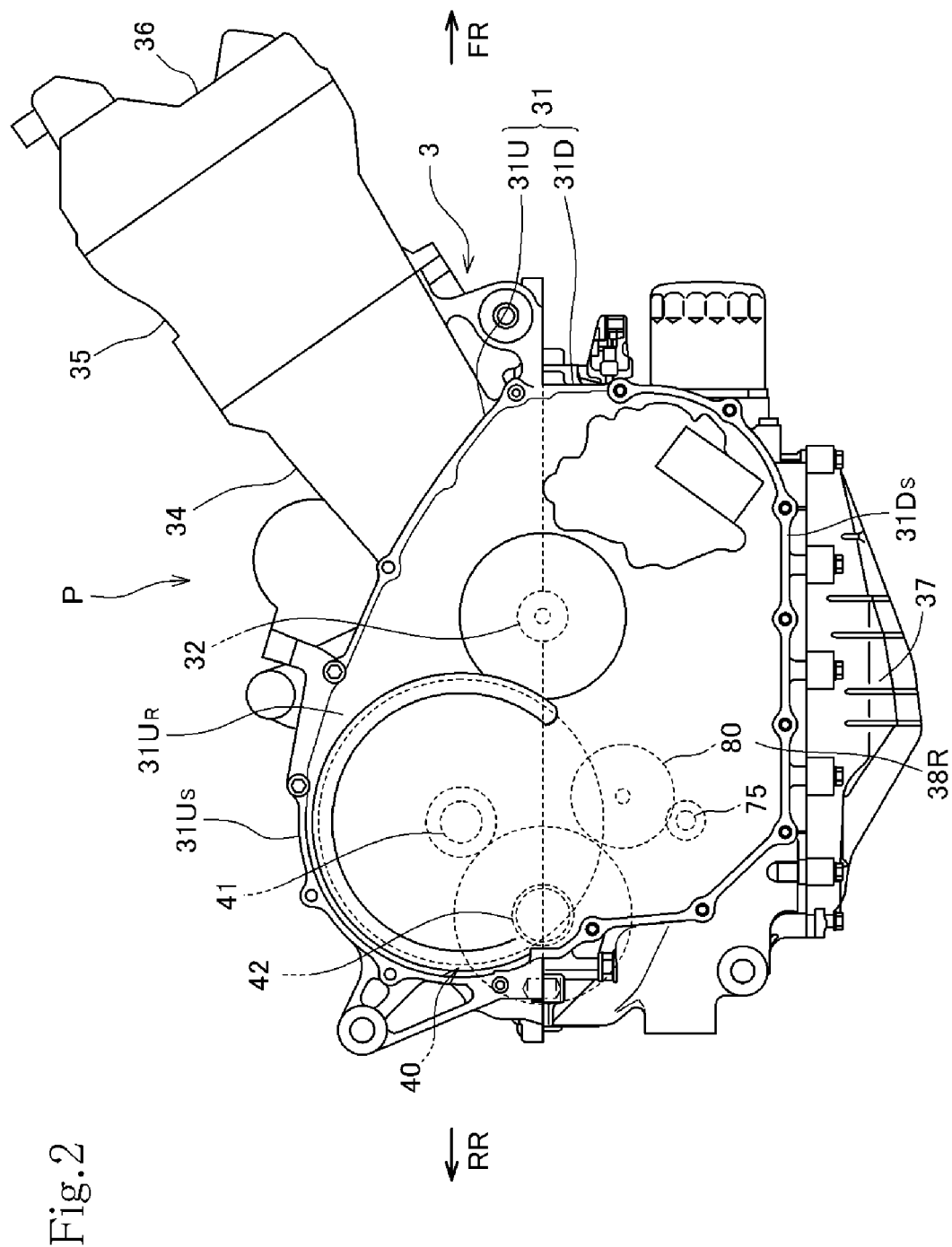
FIG. 2 is a right side view of the power unit.

As illustrated in FIG. 2, the power unit P integrally includes a water-cooled two-cylinder four-stroke cycle internal combustion engine 3 and a transmission apparatus 4 connected to the rear side of the internal combustion engine 3.

In the power unit P, a crankcase 31 rotatably supporting the crankshaft 32 extends rearward to house the transmission apparatus 4.

The crankcase 31 is configured to be divided vertically into an upper crankcase 31U and a lower crankcase 31D.

The upper crankcase 31U is configured to include a left case side wall $31U_L$ and a right case side wall $31U_R$ facing each other on the left and right sides and an upper case peripheral wall $31U_S$ integrally formed by extending toward the left and right sides to both upper peripheral edges excluding split surfaces of the left and right case side walls. The lower crankcase 31D is configured to include a left case side wall $31D_L$ and a right case side wall $31D_R$ facing each other on the left and right sides and a lower case peripheral wall $31D_S$ integrally formed by extending toward the left and right sides to both lower peripheral edges excluding split surfaces of the left and right case side walls.

On a front half portion of the upper case peripheral wall $31U_S$ of the upper crankcase 31U, a cylinder block 34, a cylinder head 35, and a head cover 36 are sequentially overlapped and is tilted forward to project forward and obliquely upward.

A bottom portion of the lower case peripheral wall $31D_S$ of the lower crankcase 31D is opened, and an oil pan 37 is provided to bulge downward.

An opening on a right side of a cylinder wall formed by combining the upper case peripheral wall $31U_S$ and the lower case peripheral wall $31D_S$ of the crankcase 31 is covered with a right crankcase cover 38R (see FIG. 4), and an opening on a left side of the cylinder wall is covered with a left crankcase cover 38L.

The crankshaft 32 directed in the right-left vehicle body width direction is pivotally supported by the split surfaces of the upper crankcase 31U and the lower crankcase 31D.

That is, the left case side wall $31U_L$ and the right case side wall $31U_R$ facing each other on the left and right sides of the upper crankcase 31U are combined with the left case side wall $31D_L$ and the right case side wall $31D_R$ facing each other on the left and right sides of the lower crankcase 31D, respectively, by the split surfaces and pivotally support the crankshaft 32 to sandwich the crankshaft.

The transmission apparatus 4 that shifts a drive force of the internal combustion engine 3 to a predetermined shift stage includes a constant mesh transmission 40, a variable speed drive mechanism 60 that operates shift stages of the transmission 40, and a clutch mechanism 53.

Figure 4:
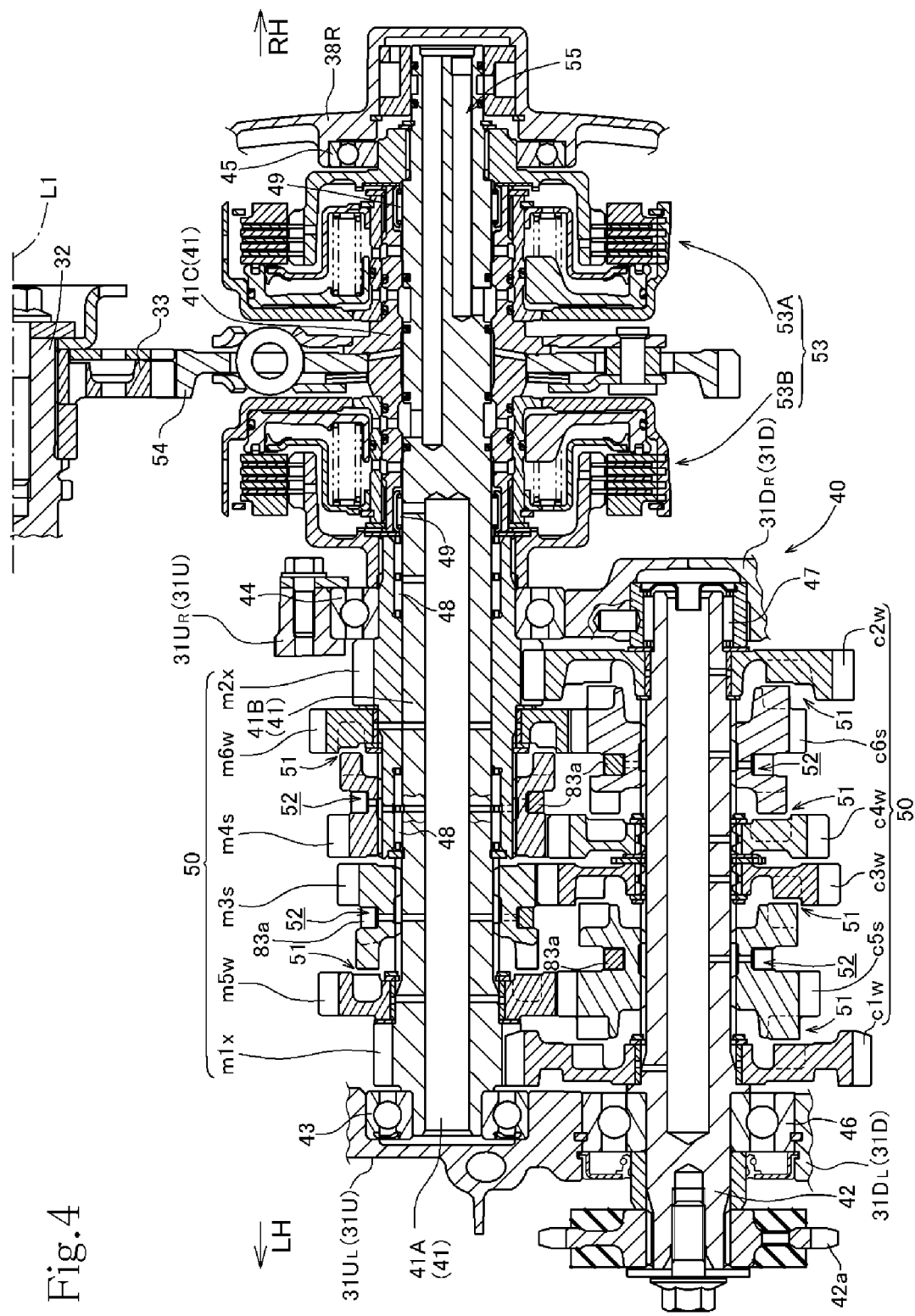
FIG. 4 is a developed cross-sectional view of the power unit along an arrow line IV-IV in FIG. 2.
Figure 5:
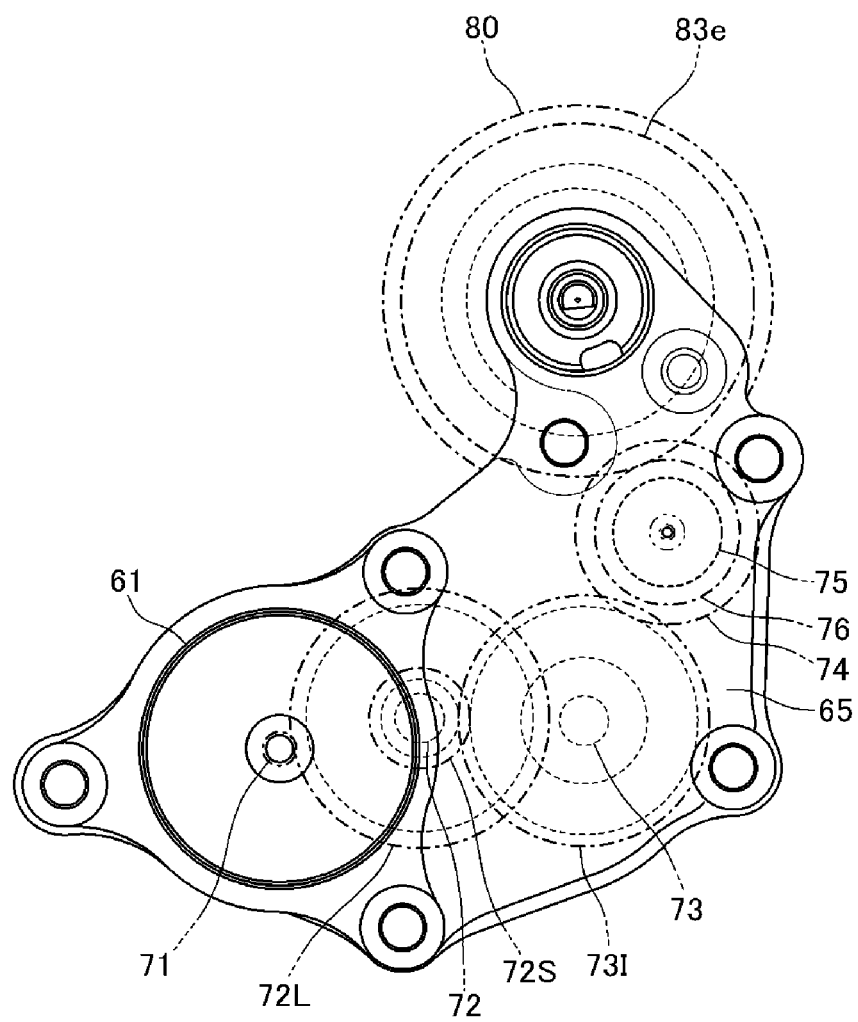
FIG. 5 is a left side view illustrating a reduction gear mechanism part of the power unit.

With reference to FIG. 4, the transmission 40 includes a constant mesh gear group 50 provided on a main shaft 41 and the counter shaft 42.

As illustrated in FIGS. 2 and 4, the main shaft 41 is disposed in the upper crankcase 31U to be parallel to the rotation axis of the crankshaft 32, obliquely above the rear side of the crankshaft 32.

The main shaft 41 is rotatably supported at a left end thereof by the left case side wall $31U_L$ of the upper crankcase 31U via a ball bearing 43, at a center thereof by the right case side wall $31U_R$ of the upper crankcase 31U via a ball bearing 44, and at a right end thereof by the right crankcase cover 38R via a ball bearing 45.

The counter shaft 42 is disposed to be parallel to the main shaft 41 by being sandwiched between the upper and lower crankcases 31U and 31D at a position obliquely below a rear side of the main shaft 41.

The counter shaft 42 is rotatably supported such that a left end thereof penetrates a ball bearing 46, a portion thereof close to the left end is sandwiched between the upper and lower crankcases 31U and 31D via the ball bearing 46, and a right end thereof is sandwiched between the upper and lower crankcases 31U and 31D via a needle bearing 47.

The drive sprocket 42a is fitted to the left end of the counter shaft 42.

As illustrated in FIG. 4, the main shaft 41 includes a long main-shaft inner shaft 41A, a main-shaft outer shaft 41B, and a clutch outer shaft 41C.

The main-shaft outer shaft 41B covers the main-shaft inner shaft 41A from a center to a center of a left half portion of the main-shaft inner shaft 41A to be relatively rotatable via a needle bearing 48.

The clutch outer shaft 41C covers the main-shaft inner shaft 41A from the center toward a right end thereof to be relatively rotatable via the needle bearing 49.

The main shaft 41 is provided with six drive gears m1 to m6 having transmission ratios from a first speed to a sixth speed, and the counter shaft 42 is provided with six driven gears c1 to c6 from the first speed to the sixth speed.

Of the drive gears m1 to m6 and the driven gears c1 to c6, corresponding gears are arranged in the order of the second speed, the sixth speed, the fourth speed, the third speed, the fifth speed, and first speed from the right side and mesh with each other, and the drive gears m1 to m6 and the driven gears c1 to c6 constitute the gear group 50.

The drive gears m2, m4, and m6 of even-numbered shift stages are provided on the main-shaft outer shaft 41B, and the drive gears m1, m3, and m5 of odd-numbered shift stages are provided on the main-shaft inner shaft 41A.

In FIG. 4, a subscript x attached to the reference numerals of the drive gears m1 to m6 and the driven gears c1 to c6 represents a fixed gear integrally molded with the shaft 41, a subscript w represents a free gear supported to be relatively rotatable with respect to the supported shafts 41 and 42, and a subscript s represents a shifter gear that is rotated integrally with the supported shafts 41 and 42 and is movable in an axial direction.

That is, the first speed drive gear m1 and the second speed drive gear m2 are fixed gears, the fifth speed drive gear m5, the sixth speed drive gear m6, the first speed driven gear c1, the second speed driven gear c2, the third speed driven gear c3, and the fourth speed driven gear c4 are free gears, and the third speed drive gear m3, the fourth speed drive gear m4, the fifth speed driven gear c5, and the sixth speed driven gear c6 are shifter gears.

A dog clutch 51 is provided between each of the shifter gears m3, m4, c5, and c6 and each of the free gears m5, m6, c1, c2, c3, and c4 adjacent to each of the shifter gears m3, m4, c5, and c6. When the shifter gears m3, m4, c5, and c6 approach the adjacent free gears m5, m6, c1, c2, c3, and c4, the dog clutch 51 meshes with each of the approaching gears, so that both the approaching gears are connected to each other to be relatively non-rotatable.

In an outer circumferential surface of each of the shifter gears m3, m4, c5, and c6, a fork groove 52 with which a fork portion of a shift fork 87 to be described below engages is formed along a circumferential direction of the outer circumferential surface.

A right half portion of the main shaft 41 is provided with the clutch mechanism 53 of a dual-clutch transmission which includes a first hydraulic clutch 53A and a second hydraulic clutch 53B arranged with a primary driven gear 54 interposed therebetween, the primary driven gear 54 being fitted to a center of a clutch outer shaft 41C to be relatively non-rotatable.

Power of the crankshaft 32 is transmitted to the clutch mechanism 53 via the primary drive gear 33 fitted to the crankshaft 32 and the primary driven gear 54, and the power is transmitted from the crankshaft 32 to the main-shaft inner shaft 41A and the main-shaft outer shaft 41B by selectively connecting the first hydraulic clutch 53A and the second hydraulic clutch 53B by the hydraulic circuit 55.

Figure 7:
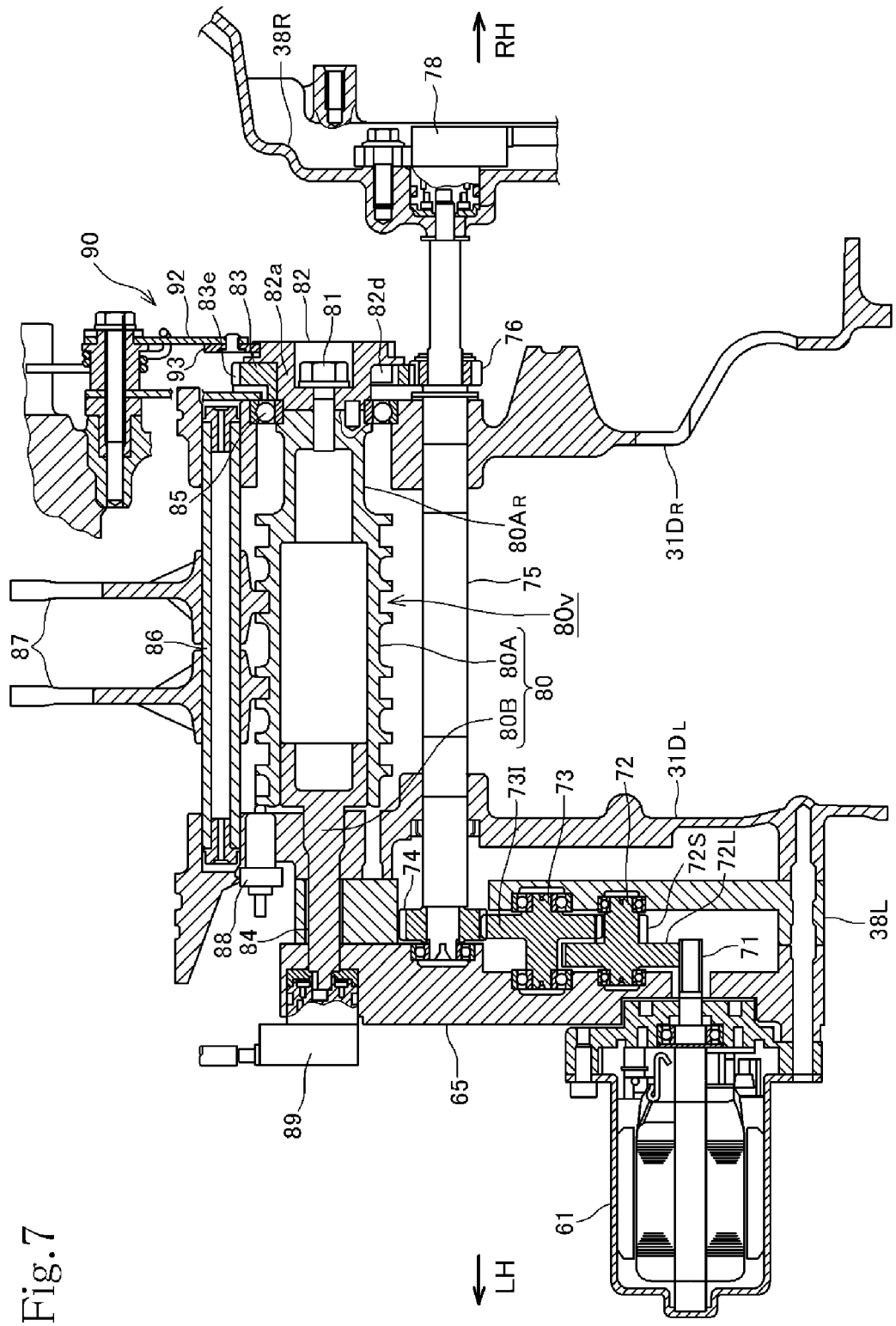
FIG. 7 is a developed cross-sectional view of a main part of the power unit along an arrow line VII-VII in FIG. 5.

As illustrated in FIG. 7, the variable speed drive mechanism 60 that moves each of the shifter gears m3, m4, c5, and c6 of the transmission 40 to switch between shift stages includes a shift motor 61, a reduction gear mechanism 70, a shift spindle 75, a shift drum 80, a shift fork shaft 86, and the shift fork 87.

The shift drum 80 includes a cylindrical drum main body 80A and a drum left shaft portion 80B, and the drum left shaft portion 80B is pivotally supported by the left case side wall $31D_L$ and the left crankcase cover 38L via a needle bearing 84.

A drum center 82 is coaxially fixed to, with a bolt 81, a right end portion of a right cylindrical portion $80A_R$ on the right side of a portion of the drum main body 80A where a lead groove 80v is formed, and a joint portion between the drum center and the right cylindrical portion is pivotally supported by the right case side wall $31D_R$ via a ball bearing 85.

The shift drum 80 is disposed below the main shaft 41 to be parallel to the main shaft 41, that is, to be directed in a right-left direction, and is rotatably supported by the needle bearing 84 and the ball bearing 85.

An end portion of the drum left shaft portion 80B penetrating the needle bearing 84 of the shift drum 80 is attached to a drum angle sensor 89 provided at a gear case cover 65 to be described below.

The drum angle sensor 89 detects a rotation angle of the shift drum 80.

Figure 8:
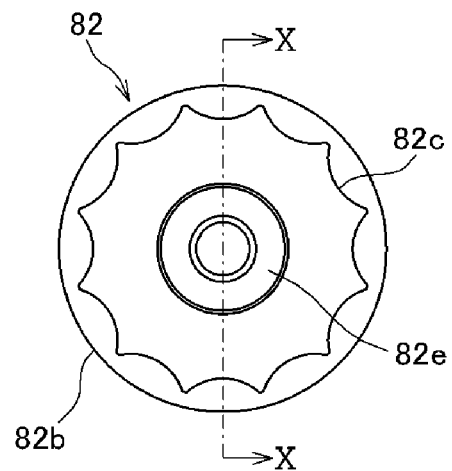
FIG. 8 is a right side view of a drum center.
Figure 9:
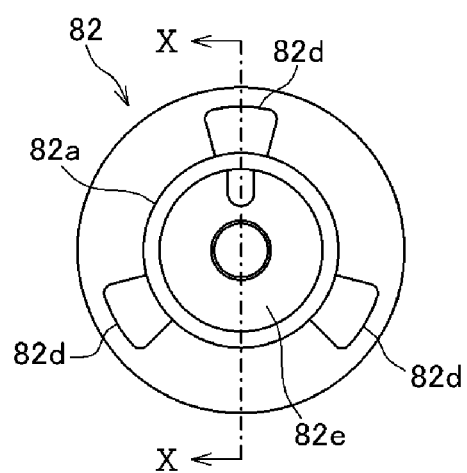
FIG. 9 is a left side view of the drum center.
Figure 10:
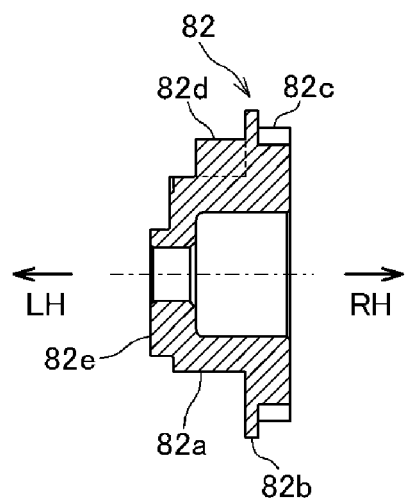
FIG. 10 is a cross-sectional view of the drum center along an arrow line X-X in FIGS. 8 and 9.

With reference to FIGS. 8 to 10, in the drum center 82 fixed to a right end portion of the shift drum 80, an outer diameter of a right side portion of the cylindrical portion 82a is increased to form an increased diameter disk portion 82b, an outer diameter of a right opening end portion of the cylindrical portion 82a on the right side from the increased diameter disk portion 82b is increased to form a star-shaped cam 82c, and a fan-shaped driven engagement portion 82d is formed at the cylindrical portion 82a on the left side from the increased diameter disk portion 82b to expand outward in a radial direction with a rotation center axis as a fan core and project leftward from the increased diameter disk portion 82b.

Three driven engagement portions 82d radially project from an outer circumferential surface of the cylindrical portion 82a at equal intervals in a circumferential direction thereof.

In the drum center 82, a decreased diameter portion 82e formed by decreasing a diameter of an end portion of a left opening of the cylindrical portion 82a comes into contact with the right end portion of the right cylindrical portion $80A_R$ of the shift drum 80 and is fixed with a bolt 81.

A shift driven gear 83 is pivotally supported on the outer circumferential surface of the cylindrical portion 82a of the drum center 82 in a relatively rotatable manner.

Figure 11:
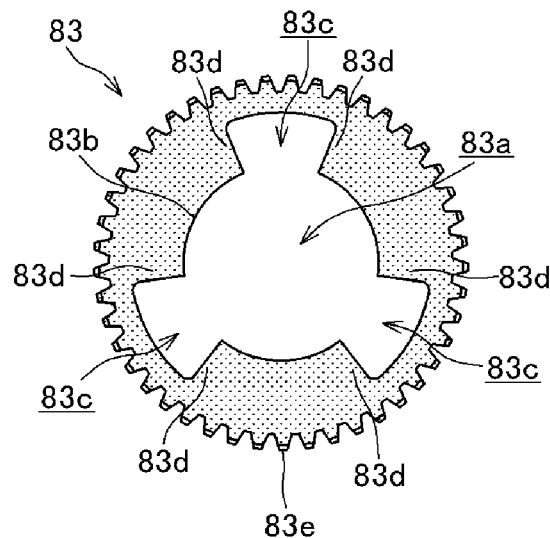
FIG. 11 is a left side view of a shift driven gear.

As illustrated in FIG. 11, the shift driven gear 83 has a hollow disk shape, and a fan-shaped recessed portion 83c recessed in a rotation axis direction is formed in a hollow disk portion 83b on an outer circumference of a hollow circle 83a of the shift driven gear. The fan-shaped recessed portion 83c expands outward in the radial direction with the rotation center axis as a fan core.

The fan-shaped recessed portion 83c is recessed in and penetrates the hollow disk portion 83b in the rotation axis direction.

A pair of side edge portions forming a pair of side edges of the fan shape of the fan-shaped recessed portion 83c in the hollow disk portion 83b of the shift driven gear 83 is a pair of drive engagement portions 83d.

Three fan-shaped recessed portions 83c of the shift driven gear 83 are radially formed to project from the hollow circle 83a at equal intervals in the circumferential direction.

Gear teeth 83e are formed on an outer circumferential edge of the hollow disk portion 83b of the shift driven gear 83.

Figure 12:
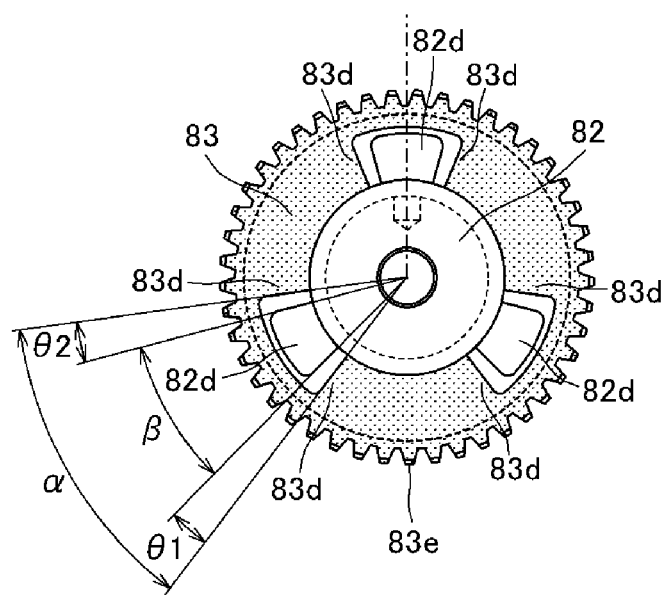
FIG. 12 is a left side view illustrating a loosely fitted state of the drum center in the shift driven gear when one gear position is set.

With reference to FIG. 12, an inner diameter of the hollow disk portion 83b of the shift driven gear 83 (an outer diameter of the hollow circle 83a) is substantially equal to an outer diameter of the cylindrical portion 82a of the drum center 82, the cylindrical portion 82a of the drum center 82 is fitted in the hollow circle 83a inside the hollow disk portion 83b of the shift driven gear 83, and the three driven engagement portions 82d of the drum center 82 are fitted in the three fan-shaped recessed portions 83c of the shift driven gear 83.

An angle α between a pair of side edges of the fan-shaped recessed portion 83c of the shift driven gear 83 (an angle between a pair of drive engagement portions 83d opened in a fan shape) is larger than an angle β between a pair of side edges of the fan-shaped driven engagement portion 82d of the drum center 82, and the driven engagement portion 82d of the drum center 82 is loosely fitted to be relatively rotatable with a play angle θ in the circumferential direction between a pair of drive engagement portions 83d which is a pair of side edge portions of the shift driven gear 83.

FIG. 12 illustrates a state where the vehicle is stopped at a certain gear position, and there are a first play angle θ1 and a second play angle θ2 on both sides of the driven engagement portion 82d.

The sum of the first play angle θ1 and the second play angle θ2 is a so-called play angle θ ($=θ1+θ2=α-β$).

As illustrated in FIG. 3, a left crankcase cover 38L covering the left side of the left case side wall $31D_L$ of the lower crankcase 31D is provided with the reduction gear mechanism 70 covered with the gear case cover 65 provided slightly rearward from the center.

As illustrated in FIG. 7, the reduction gear mechanism 70 is provided as a reduction gear train in a gear case between the left crankcase cover 38L and the gear case cover 65 attached to the left side thereof.

The shift motor 61 is attached to a lower portion of the gear case cover 65 to project leftward, and a drive gear 71 formed on a drive shaft of the shift motor 61 penetrates the gear case cover 65 rightward and projects in a gear case (see FIG. 7).

On the other hand, in the vicinity of the lower side of the shift drum 80, the shift spindle 75 is directed in the right-left direction, bridges a space between the left case side wall $31D_L$ and the right case side wall $31D_R$ of the lower crankcase 31D, and is rotatably supported.

As illustrated in FIG. 7, the shift spindle 75 penetrates the right case side wall $31D_R$ rightward, and a right end of the shift spindle reaches the right crankcase cover 38R and is attached to a spindle angle sensor 78 provided in the right crankcase cover 38R.

A rotation angle of the shift spindle 75 is detected by the spindle angle sensor 78.

A shift drive gear 76 is fit-attached to a portion of the shift spindle 75, the portion penetrating the right case side wall $31D_R$ rightward.

The shift drive gear 76 meshes with (the gear teeth 83e of) the shift driven gear 83 loosely fitted to the drum center 82 integrally attached to a right end of the shift drum 80 to be relatively rotatable with a play angle in the circumferential direction.

The shift driven gear 83 has more teeth than the shift drive gear 76, is decelerated, and transmits power.

As illustrated in FIG. 7, the shift spindle 75 penetrates the left case side wall $31D_L$ leftward, and a left end of the shift spindle 75 is inserted into the gear case.

The reduction gear mechanism 70 is formed between a spindle driven gear 74 fit-attached to the left end of the shift spindle 75 and the drive gear 71 of the drive shaft of the shift motor 61.

Two first and second gear shafts 72 and 73 are provided between the drive gear 71 and the spindle driven gear 74 to be directed in the right-left direction, and both ends of each of the first and second gear shafts are supported by the gear case cover 65 and the left crankcase cover 38L to rotatably bridge a space therebetween.

The drive gear 71 of the shift motor 61 meshes with a large-diameter gear 72L of the first gear shaft 72, a small-diameter gear 72S of the first gear shaft 72 meshes with an idle gear 73I of the second gear shaft 73, and the idle gear 73I of the second gear shaft 73 meshes with the spindle driven gear 74 of the shift spindle 75 such that the reduction gear mechanism 70 is configured.

Hence, rotation of a drive gear 62 of the shift motor 61 is decelerated via the reduction gear train of the reduction gear mechanism 70 and transmitted to rotation of the shift spindle 75, and the rotation of the shift spindle 75 results in rotation of the shift driven gear 83 meshing with the shift drive gear 76.

The rotation of the shift driven gear 83 results in integral rotation of the drum center 82 with the shift drum 80, the drum center 82 being loosely fitted to be relatively rotatable with the play angle θ in the circumferential direction.

The rotation of the shift drum 80 results in movement of the shift fork 87 in the axial direction by being guided by the lead groove 80v formed in the outer circumferential surface of the shift drum 80, and the shifter gears m3, m4, c5, and c6 of the transmission 40 are moved in the axial direction to switch between the shift stages of the transmission 40.

With reference to FIG. 8, the star-shaped cam 82c formed in the drum center 82 fixed to the right end of the shift drum 80 has an uneven cam surface in which a plurality of protrusions and depressions are alternately arranged at regular intervals on the outer circumferential surface of the star-shaped cam.

Figure 6:
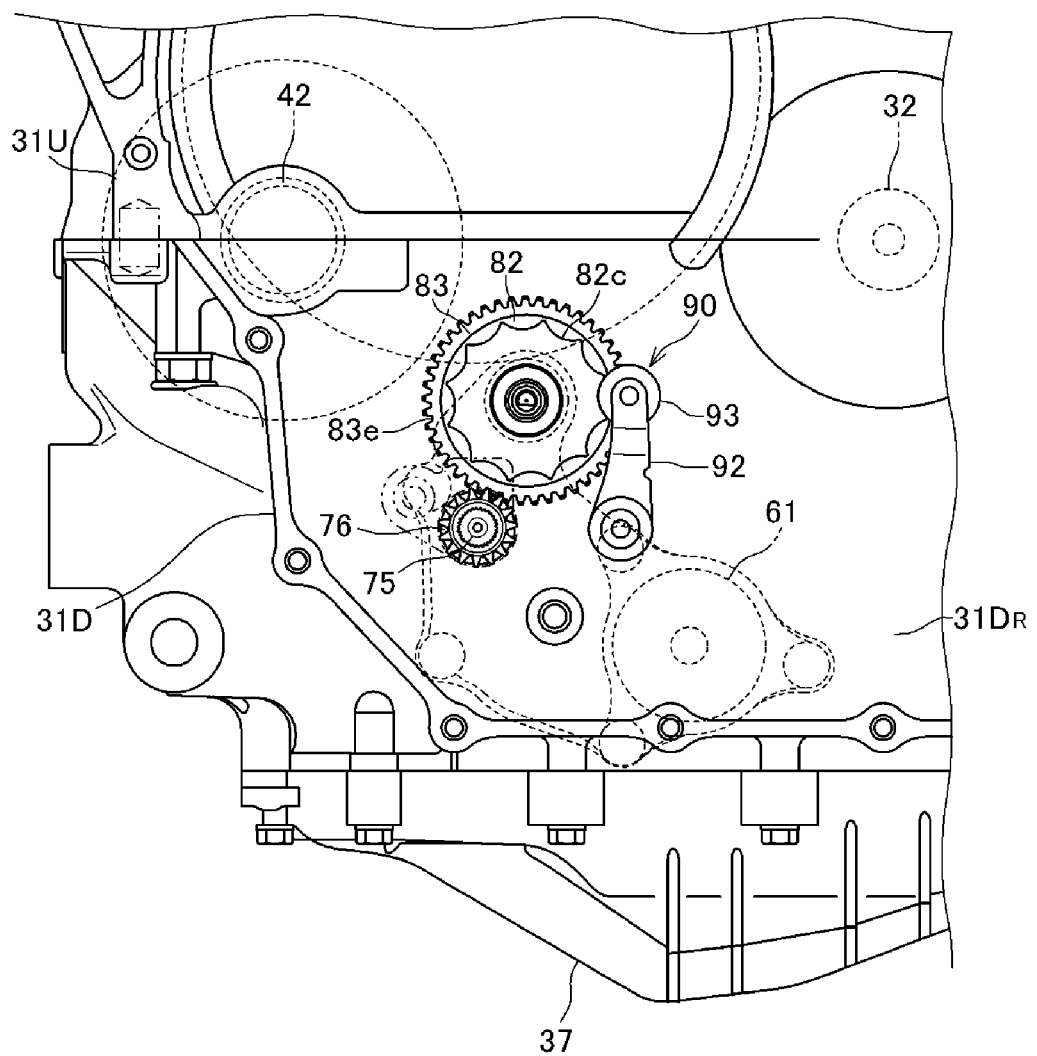
FIG. 6 is a partial right side view of a lower crankcase of the power unit.

As illustrated in FIG. 6, a stopper mechanism 90 in which a stopper roller 93 pivotally supported by a distal end of a swing-biased stopper arm 92 is pressed is provided at the uneven cam surface of the star-shaped cam 82c.

The stopper mechanism 90 positions the shift drum 80 at a rotational position of a suitable shift stage by fitting the stopper roller 93 into a recess of the uneven cam surface of the star-shaped cam 82c.

In a dual-clutch transmission, in a case of shifting from the first speed to the second speed, a gear position of a shift drum is switched from a first speed position (1-N) to a second speed position (N-2) via a preliminary first speed-second speed shift position (1-2).

Since the transmission 40 is of a dual-clutch type and has the six shift stages, 12 gear positions (N-N, 1-N, 1-2, N-2, 3-2, 3-N, 3-4, N-4, 5-4, 5-N, 5-6, N-6) from a neutral position to six speed positions and individual preliminary shift positions are set in the shift drum 80, and thus gear position intervals are set to 30-degree intervals.

Hence, 12 recesses are formed at 30-degree intervals in the uneven cam surface of the star-shaped cam 82c for positioning the shift drum 80 by the stopper mechanism 90.

As described above, with reference to FIG. 12, the drum center 82 integrated with the shift drum 80 and the shift driven gear 83 are loosely fitted to be relatively rotatable with the play angle θ in the circumferential direction.

In order to smoothly transmit power from the shift driven gear 83 to the shift drum 80, the play angle θ ($=\alpha-\beta$) is desirably about 10 to 30% of the gear position interval.

In the transmission apparatus 4, since the gear position interval is 30 degrees, the play angle θ is set to about 3 to 9 degrees.

The variable speed drive mechanism 60 is provided in which the shift drive gear 76 provided integrally to the shift spindle 75 that is rotated in synchronization with the shift motor 61 meshes with the shift driven gear 83 at a predetermined reduction ratio, and the drum center 82 that is rotated by loosely being fitted in the shift driven gear 83 in the circumferential direction rotates the shift drum 80 integrally. Hence, a pole ratchet mechanism and the like can be eliminated to reduce the number of components and simplify the structure, the spindle angle sensor 78 only needs to detect the rotation angle of the shift spindle 75, and there is no need to provide a mechanism for another angle sensor. Hence, the number of components can be further reduced to achieve a simple structure and cost reduction.

FIG. 12 illustrates a state of stopping at a certain gear position, in which the drum center 82 is positioned by the stopper mechanism 90, and the shift driven gear 83 indicates a neutral position where the first play angle θ1 and the second play angle θ2 on both sides of the driven engagement portion 82d are equal.

In order to switch the gear position from this state, the shift motor 61 is driven to control the shift driven gear 83 to be rotated toward the neutral position (target position) of the next-stage gear position.

When the shift driven gear 83 is rotated by the drive of the shift motor 61 via the reduction gear mechanism 70, the shift spindle 75, and the shift drive gear 76, one drive engagement portion 83d on the rear side in the rotation direction of the pair of drive engagement portions 83d of the shift driven gear 83 reduces the first play angle θ1 to abut on the driven engagement portion 82d of the drum center 82.

Figure 13:
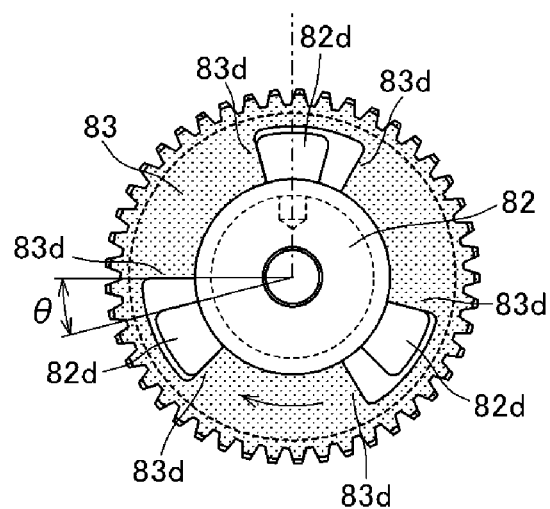
FIG. 13 is a left side view illustrating a state of the drum center and the shift driven gear when a drive engagement portion of the shift driven gear abuts on a driven engagement portion of the drum center.

FIG. 13 illustrates a state in which the drive engagement portion 83d abuts on the driven engagement portion 82d.

The drive engagement portion 83d of the shift driven gear 83 abuts on the driven engagement portion 82d of the drum center 82 and then pushes and accompany the driven engagement portion 82d. Thereafter, the drum center 82 is positioned at a position where the driven engagement portion 82d is separated from the drive engagement portion 83d by the stopper mechanism 90 and is rotated by 30 degrees to the next-stage gear position. When the shift driven gear 83 is rotated to the neutral position of the next-stage gear position with a delay, the shift driven gear stops and reaches the next-stage gear position illustrated in FIG. 14.

Figure 14:
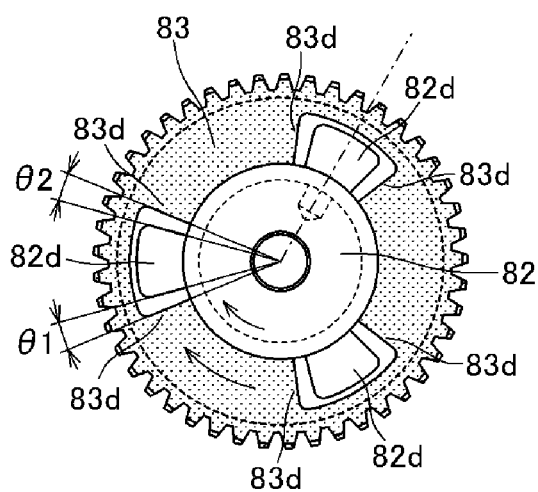
FIG. 14 is a left side view illustrating a loosely fitted state of the drum center in the shift driven gear when movement is performed and the next-stage gear position is set.

Also in the state illustrated in FIG. 14, the shift driven gear 83 is located at the neutral position where the first play angle θ1 and the second play angle θ2 on both sides of the driven engagement portion 82d are equal.

The description provided above represents ideal gear position state and operation when the gear position is switched.

However, in practice, when the gear position is set to a certain gear position, the shift driven gear 83 is not necessarily located at the neutral position where the first play angle θ1 and the second play angle θ2 on both sides of the driven engagement portion 82d of the drum center 82 are equal, that is, the shift driven gear 83 is not necessarily located at the neutral position with respect to the drum center 82 positioned by the stopper mechanism 90.

Therefore, when the shift driven gear 83 is displaced from the neutral position with respect to the drum center 82, the shift driven gear 83 is controlled to be rotated to a position displaced from the neutral position of the next-stage gear position, in the driving of the shift motor 61 based on a control value of the shift driven gear 83 that rotates the shift driven gear 83 toward the neutral position (target position) of the next-stage gear position.

In this respect, the shift control device 100 of the variable speed drive mechanism 60 performs control to find the deviation of the shift driven gear 83 from the neutral position with respect to the drum center 82, correct the control value of the shift driven gear 83, and correct the deviation of the shift driven gear 83 from the neutral position of the next-stage gear position.

Figure 15:
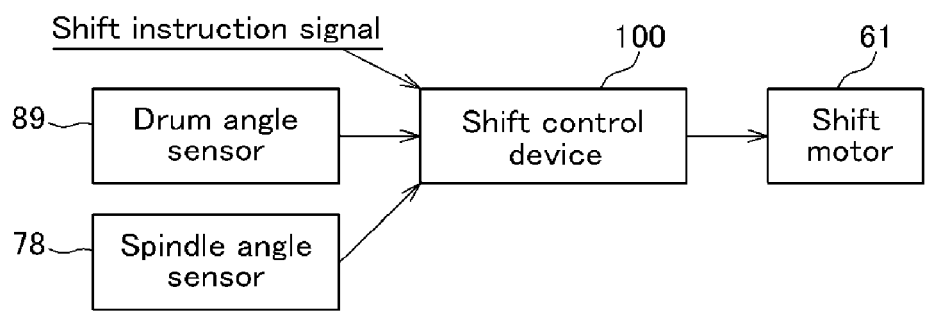
FIG. 15 is a simplified block diagram of a control system of a shift control device.

FIG. 15 is a simplified block diagram of a control system of the shift control device 100.

The shift control device 100 receives inputs of a shift instruction signal, a detected drum angle obtained by detecting the rotation angle of the shift drum 80 from the drum angle sensor 89, and a detected spindle angle obtained by detecting the rotation angle of the shift spindle 75 from the spindle angle sensor 78.

The shift control device 100 performs arithmetic processing on the basis of these items of data to perform drive control of the shift motor 61.

A rotation angle of the drum center 82 integrated with the shift drum 80 can be detected by the drum angle sensor 89, and the detected drum angle is defined as the rotation angle of the drum center 82.

On the other hand, the rotation angle of the shift driven gear 83 can be calculated from the rotation angle of the shift spindle 75 integrally including the shift drive gear 76 meshing with the shift driven gear 83, and the rotation angle of the shift spindle 75 can be detected by the spindle angle sensor 78.

The shift driven gear 83 has more teeth than the shift drive gear 76, is decelerated, and transmits power.

In this respect, the shift control device 100 converts the detected spindle angle detected by the spindle angle sensor 78 into the rotation angle of the shift driven gear 83 on the drum shaft at a reduction ratio at which deceleration is performed and the power is transmitted, calculates a drum shaft conversion spindle integration angle φs obtained by integrating conversion values so far, and sets the drum shaft conversion spindle integration angle φs as the rotation angle of the shift driven gear 83 that can be compared with the detected drum angle φd of the drum angle sensor 89.

At a certain gear position, as illustrated in FIG. 12, when the shift driven gear 83 is located at the neutral position where the first play angle θ1 and the second play angle θ2 are equal to each other with respect to the drum center 82, the drum shaft conversion spindle integration angle φs of the shift driven gear 83 and the detected drum angle φd of the drum center 82 are ideally equal to each other, but in practice are not necessarily equal to each other.

That is, a difference angle Δφ between the drum shaft conversion spindle integration angle φs and the detected drum angle φd when a certain gear position is set does not indicate the deviation of the shift driven gear 83 from the neutral position with respect to the drum center 82.

In this respect, the shift control device 100 learns the difference angle Δφ between the drum shaft conversion spindle integration angle φs and the detected drum angle φd, over a predetermined learning time T from a stopped state after the shift motor 61 is further driven in a shift-up direction when the transmission 40 is set in a top gear state (sixth speed state), and the drive engagement portion 83d of the shift driven gear 83 reduces the play angle to abut on the driven engagement portion 82d of the drum center 82 to accompany the driven engagement portion 82d (referred to as shift-up direction learning).

Figure 16:
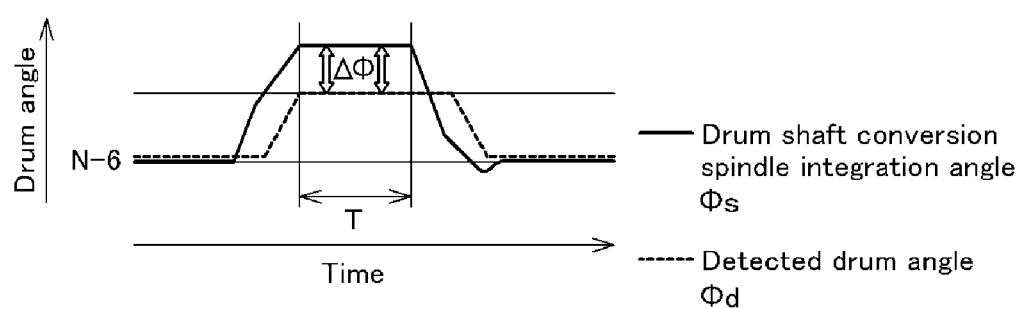
FIG. 16 is a graph illustrating changes of a drum shaft conversion spindle integration angle and a detected drum angle at the time of shift-up direction learning.

FIG. 16 is a graph illustrating changes in the drum shaft conversion spindle integration angle φs and the detected drum angle φd when the shift motor 61 is driven in the shift-up direction in order to perform the shift-up direction learning.

The horizontal axis represents time, and the vertical axis represents a drum angle.

With reference to FIG. 16, when the sixth speed gear position (N-6) is set at first, and the shift motor 61 is driven further in the shift-up direction from the sixth speed, the shift driven gear 83 is rotated to increase the drum shaft conversion spindle integration angle φs. In addition, when the drive engagement portion 83d of the shift driven gear 83 reduces the play angle to abut on the driven engagement portion 82d of the drum center 82, the driven engagement portion 82d is accompanied such that the detected drum angle φd is also increased together with the drum shaft conversion spindle integration angle φs.

Thereafter, since the shift drum 80 and the drum center 82 reach a rotation limit position and are stopped and fixed, the shift driven gear 83 is also stopped, and both the drum shaft conversion spindle integration angle φs and the detected drum angle φd are maintained in a constant state.

The difference angles Δφ between the drum shaft conversion spindle integration angles φs and the detected drum angles φd is learned over the predetermined learning time T from when the drum center 82 and the shift driven gear 83 are stopped, and both the drum shaft conversion spindle integration angle φs and the detected drum angle φd are maintained in the constant state.

The learned difference angles Δφ are averaged over the predetermined learning time T.

The difference angle Δφ between the drum shaft conversion spindle integration angle φs and the detected drum angle φd is learned over the predetermined learning time T from a stopped and fixed state after the drive engagement portion 83d of the shift driven gear 83 reduces the play angle to abut on the driven engagement portion 82d of the drum center 82 to accompany the driven engagement portion 82d. Hence, the learning is performed when a clear relative positional relationship is set between the drum center 82 and the shift driven gear 83, that is, when the drive engagement portion 83$d$ of the shift driven gear 83 reduces the play angle to be in contact with the driven engagement portion 82$d$ of the drum center 82.

It can be estimated that the difference angle $\Delta\varphi$ between the drum shaft conversion spindle integration angle $\varphi s$ and the detected drum angle $\varphi d$ learned when the drive engagement portion 83$d$ of the shift driven gear 83 reduces the play angle to be in contact with the driven engagement portion 82$d$ of the drum center 82 reflects the deviation between the drum center 82 and the shift driven gear 83 when the drum center 82 is positioned at the gear position.

By correcting the control value of the shift motor 61 by the average difference angle obtained by averaging the learned difference angles $\Delta\varphi$, it is possible to correct the deviation between the drum center 82 and the shift driven gear 83 when the drum center is positioned at the gear position and to accurately control the rotation of the shift drum 80 by the shift motor 61.

When the transmission 40 is set in the top gear state, the shift motor 61 is further driven in the shift-up direction, and the difference angle $\Delta\varphi$ between the drum shaft conversion spindle integration angle $\varphi s$ and the detected drum angle $\varphi d$ is learned, so that a fixed state of the drum center 82 can be simply set, and the highly accurate difference angle $\Delta\varphi$ can be learned.

When the transmission 40 is set in the top gear state, the shift motor 61 is further driven in the shift-up direction, and the difference angle $\Delta\varphi$ between the drum shaft conversion spindle integration angle $\varphi s$ and the detected drum angle $\varphi d$ is learned, so that the learning can be performed with little influence on shifting work.

In addition, the shift control device 100 according to another embodiment learns the difference angle $\Delta\varphi$ between the drum shaft conversion spindle integration angle $\varphi s$ and the detected drum angle $\varphi d$, over the predetermined learning time T from a stopped state after the shift motor 61 is further driven in a shift-down direction when the transmission 40 is set in the neutral state, and the drive engagement portion 83$d$ of the shift driven gear 83 reduces the play angle to abut on the driven engagement portion 82$d$ of the drum center 82 to accompany the driven engagement portion 82$d$ (referred to as shift-down direction learning).

Figure 17:
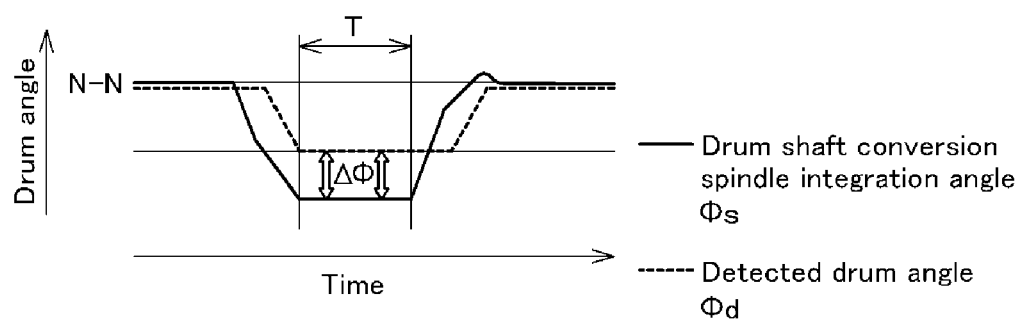
FIG. 17 is a graph illustrating changes of the drum shaft conversion spindle integration angle and the detected drum angle at the time of shift-down direction learning.

FIG. 17 is a graph illustrating changes in the drum shaft conversion spindle integration angle $\varphi s$ and the detected drum angle $\varphi d$ when the shift motor 61 is driven in the shift-down direction in order to perform the shift-down direction learning.

With reference to FIG. 17, when the gear position (N-N) of the neutral state is set at first, and the shift motor 61 is driven further in the shift-down direction from the neutral state, the shift driven gear 83 is rotated to decrease the drum shaft conversion spindle integration angle $\varphi s$. In addition, when the drive engagement portion 83$d$ of the shift driven gear 83 reduces the play angle to abut on the driven engagement portion 82$d$ of the drum center 82, the driven engagement portion 82$d$ is accompanied such that the detected drum angle $\varphi d$ is also decreased together with the drum shaft conversion spindle integration angle $\varphi s$.

Thereafter, since the shift drum 80 and the drum center 82 reach a rotation limit position and are stopped and fixed, the shift driven gear 83 is also stopped, and both the drum shaft conversion spindle integration angle $\varphi s$ and the detected drum angle $\varphi d$ are maintained in a constant state.

The difference angles $\Delta\varphi$ between the drum shaft conversion spindle integration angles $\varphi s$ and the detected drum angles $\varphi d$ are learned over the predetermined learning time T from when both the drum shaft conversion spindle integration angle $\varphi s$ and the detected drum angle $\varphi d$ are maintained in the constant state in which the drum center 82 and the shift driven gear 83 are stopped.

The learned difference angles $\Delta\varphi$ are averaged over the predetermined learning time T.

It can be estimated that the difference angle $\Delta\varphi$ between the drum shaft conversion spindle integration angle $\varphi s$ and the detected drum angle $\varphi d$ learned when the drive engagement portion 83$d$ of the shift driven gear 83 reduces the play angle to be in contact with the driven engagement portion 82$d$ of the drum center 82 reflects the deviation between the drum center 82 and the shift driven gear 83 when the drum center 82 is positioned at the gear position.

By correcting the control value of the shift motor 61 by the average difference angle obtained by averaging the learned difference angles $\Delta\varphi$, it is possible to correct the deviation between the drum center 82 and the shift driven gear 83 and to accurately control the rotation of the shift drum 80 by the shift motor 61.

When the transmission 40 is set in the neutral state, the shift motor 61 is further driven in the shift-down direction, and the difference angle $\Delta\varphi$ between the drum shaft conversion spindle integration angle $\varphi s$ and the detected drum angle $\varphi d$ is learned, so that a fixed state of the drum center 82 can be simply set, and the highly accurate difference angle $\varphi$ can be learned.

When the transmission 40 is set in the neutral state, the shift motor 61 is further driven in the shift-down direction, and the difference angle $\Delta\varphi$ between the drum shaft conversion spindle integration angle $\varphi s$ and the detected drum angle $\varphi d$ is learned, so that the learning can be performed with little influence on shifting work during the learning.

In addition, as another embodiment, the difference angle $\Delta\varphi$ between the drum shaft conversion spindle integration angle $\varphi s$ and the detected drum angle $\varphi d$ may be learned by combining the shift-up direction learning and the shift-down direction learning.

Now, the deviation between the drum center 82 and the shift driven gear 83 is represented by Z.

In the shift-up direction learning, in the stopped state after the drive engagement portion 83$d$ of the shift driven gear 83 reduces the play angle to abut on the driven engagement portion 82$d$ of the drum center 82 to accompany the driven engagement portion 82$d$, the difference angle $\Delta\varphi$ ($=\varphi s-\varphi d$) is $\theta$ when no deviation Z occurs and is $\theta-Z$ when the deviation Z occurs.

On the other hand, in the shift-down direction learning, in the stopped state after the drive engagement portion 83$d$ of the shift driven gear 83 reduces the play angle to abut on the driven engagement portion 82$d$ of the drum center 82 to accompany the driven engagement portion 82$d$, the difference angle $\varphi(=\varphi s-\varphi d)$ is $-\theta-Z$ when the deviation Z occurs.

Hence, when the difference angle $\Delta\varphi$ at the time of the shift-up direction learning and the difference angle $\Delta\varphi$ at the time of the shift-down direction learning are averaged, $$\{(\theta - Z) + (-\theta - Z)\}/2 = (-2Z)/2 = -Z,$$

and the average of the difference angles $\Delta\varphi$ is $-Z$.

Hence, an ideally corrected detected spindle angle can be obtained by subtracting the average $-Z$ of the difference angles $\Delta\varphi$ from the current detected spindle angle, that is, by adding Z.

Hence, the deviation Z includes not only mechanical deviation but also deviation of an individual output difference of the spindle angle sensor 78 that detects the detected spindle angle.

The drum shaft conversion spindle integration angle φs is calculated using the corrected detected spindle angle, and the difference angle Δφ between the corrected drum shaft conversion spindle integration angle φs and the detected drum angle φd can be learned with higher accuracy. By correcting the control value of the shift motor 61 with the difference angle Δφ, it is possible to correct the deviation between the drum center 82 and the shift driven gear 83 when the gear position is set, and to control the rotation of the shift drum 80 by the shift motor 61 with higher accuracy.

Further, the shift control device 100 according to still another embodiment learns the difference angle Δφ between the drum shaft conversion spindle integration angle φs and the detected drum angle φd is learned over the predetermined learning time T from when the shift motor 61 is driven to shift the transmission 40, and the drive engagement portion 83d of the shift driven gear 83 reduces the play angle to abut on the driven engagement portion 82d of the drum center 82 to accompany the driven engagement portion 82d (referred to as shifting process learning)

Figure 18:
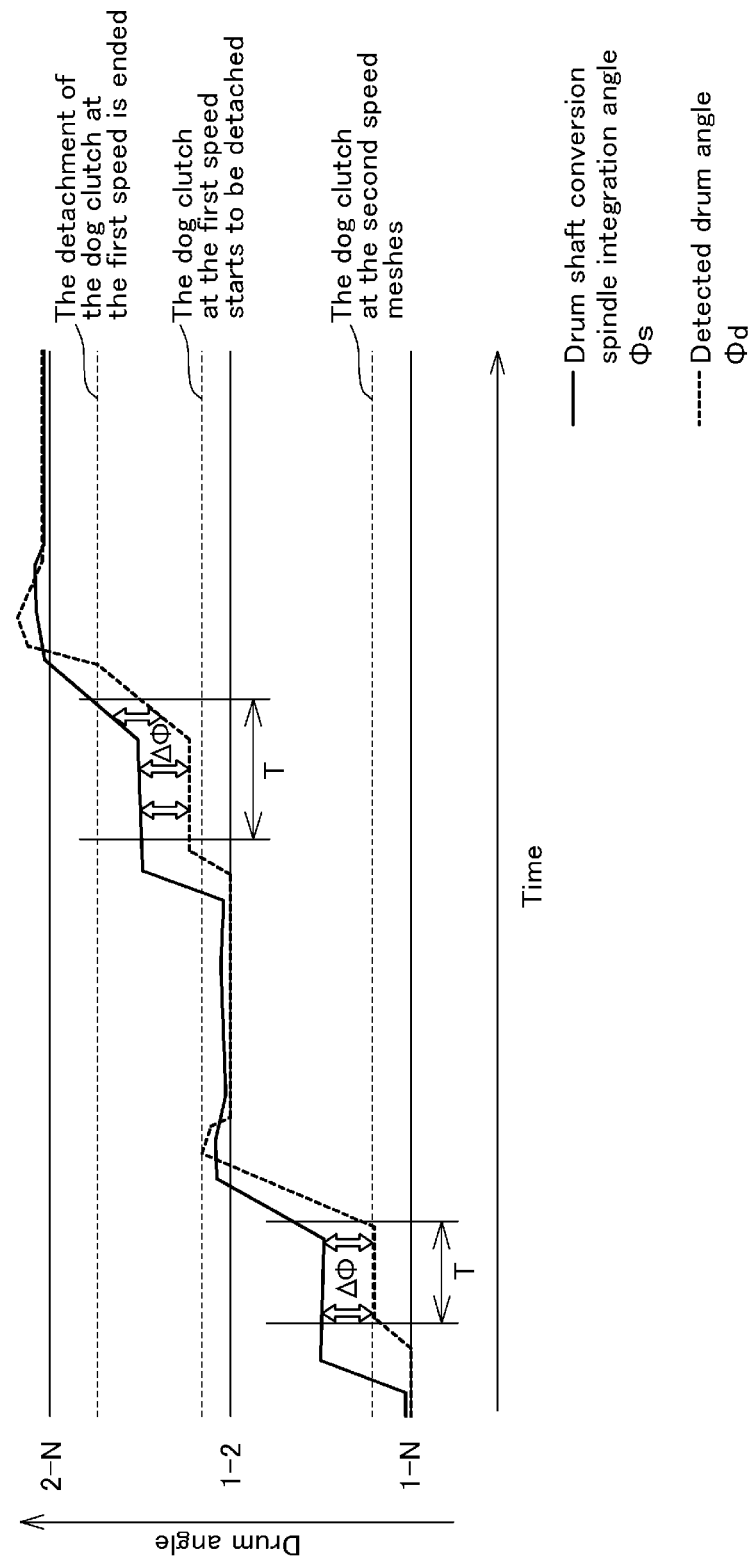
FIG. 18 is a graph illustrating changes of the drum shaft conversion spindle integration angle and the detected drum angle at the time of shifting process learning.

FIG. 18 is a graph illustrating changes in the drum shaft conversion spindle integration angle φs and the detected drum angle φd when the shift motor 61 is driven to perform shifting in order to perform the shifting process learning.

FIG. 18 illustrates an example of the case of shifting from the first speed to the second speed.

As described above, in the dual-clutch transmission, in the case of shifting from the first speed to the second speed, the gear position of the shift drum is switched from the first speed position (1-N) to the second speed position (N-2) via the preliminary first speed-second speed shift position (1-2).

With reference to FIG. 18, when the first speed gear position (1-N) is set at first, and the shift motor 61 is driven further in the shift-up direction from the first speed, the shift driven gear 83 is rotated to increase the drum shaft conversion spindle integration angle φs. In addition, when the drive engagement portion 83d of the shift driven gear 83 reduces the play angle to abut on the driven engagement portion 82d of the drum center 82, the driven engagement portion 82d is accompanied such that the detected drum angle φd is also increased together with the drum shaft conversion spindle integration angle φs.

Thereafter, the shift drum 80 and the drum center 82 are stopped by the positioning of the stopper mechanism 90, the drive engagement portion 83d of the shift driven gear 83 which is once separated abuts on the driven engagement portion 82d of the drum center 82 again and is stopped, and both the drum shaft conversion spindle integration angle (s and the detected drum angle φd are maintained in the constant state.

Approximately at that time, the dog clutch 51 at the second speed meshes.

The difference angle Δφ between the drum shaft conversion spindle integration angle φs and the detected drum angle φd can be learned, and the difference angle Δφ that maintains a constant value can be learned with accuracy, over the predetermined learning time T from when the drive engagement portion 83d of the shift driven gear 83 reduces the play angle to abut on the driven engagement portion 82d of the drum center 82 to accompany the driven engagement portion 82d such that the difference angle Δφ is maintained as the constant value.

Subsequently, the driven engagement portion 82d of the drum center 82 with which the drive engagement portion 83d of the shift driven gear 83 is in contact is accompanied, and the detected drum angle φd is also increased together with the drum shaft conversion spindle integration angle φs.

When the gear position is set at the preliminary first speed-second speed shift position (1-2), the shift drum 80 and the drum center 82 are stopped by the positioning of the stopper mechanism 90, and the shift driven gear 83 is stopped later.

Approximately from that time, the dog clutch 51 at the first speed starts to be detached by switching the hydraulic clutch of the dual-clutch transmission.

The shift motor 61 is driven from the preliminary first speed-second speed shift position (1-2), and thereby the shift driven gear 83 is rotated to increase the drum shaft conversion spindle integration angle φs. In addition, when the drive engagement portion 83d of the shift driven gear 83 reduces the play angle to abut on the driven engagement portion 82d of the drum center 82, the driven engagement portion 82d is accompanied such that the detected drum angle φd is also increased together with the drum shaft conversion spindle integration angle φs.

Thereafter, the shift drum 80 and the drum center 82 are stopped by the positioning of the stopper mechanism 90, the drive engagement portion 83d of the shift driven gear 83 which is once separated abuts on the driven engagement portion 82d of the drum center 82 again and is stopped, and both the drum shaft conversion spindle integration angle (s and the detected drum angle φd are maintained in the constant state.

The difference angle Δφ between the drum shaft conversion spindle integration angle φs and the detected drum angle φd can be learned, and the difference angle Δφ that maintains a constant value can be learned with accuracy, over the predetermined learning time T from when the drive engagement portion 83d of the shift driven gear 83 reduces the play angle to abut on the driven engagement portion 82d of the drum center 82 to accompany the driven engagement portion 82d such that the difference angle Δφ is maintained as the constant value.

Subsequently, the driven engagement portion 82d of the drum center 82 with which the drive engagement portion 83d of the shift driven gear 83 is in contact is accompanied, and the detected drum angle φd is also increased together with the drum shaft conversion spindle integration angle φs.

The learning time T may include a time until both the detected drum angle φd and the drum shaft conversion spindle integration angle φs start to be increased.

When the gear position is set at the second speed position (2-N), the shift drum 80 and the drum center 82 are stopped by the positioning of the stopper mechanism 90, and the shift driven gear 83 is stopped later.

The detachment of the dog clutch 51 at the first speed is ended by putting effort to set the gear position at the second speed position (2-N).

In the shifting process from the first speed to the second speed, the shifting process learning is performed in front and behind the preliminary first speed-second speed shift position (1-2), but may be performed either in front or behind the preliminary first speed-second speed shift position.

In both the shifting process learning performed in front and behind the preliminary first speed-second speed shift position, the difference angles Δφ between the drum shaft conversion spindle integration angle φs and the detected drum angle φd can be learned with high accuracy when the drum center 82 is set in the stopped state, and the learned difference angles Δφ are averaged over the predetermined learning time T. The control value of the shift motor 61 is corrected by the average difference angle obtained by performing the averaging process, so that it is possible to correct the deviation between the drum center 82 and the shift driven gear 83 when the gear position is set, and it is possible to control the rotation of the shift drum 80 by the shift motor 61 with high accuracy.

It is possible to accurately learn the difference angle Δφ between the drum shaft conversion spindle integration angle φs and the detected drum angle φd in the same manner not only in the shift-up process from the first speed to the second speed but also in other shift-up processes.

Further, also in a shift-down process, the drive engagement portion 83d of the shift driven gear 83 reduces the play angle to abut on the driven engagement portion 82d of the drum center 82 to accompany the driven engagement portion 82d such that the difference angle Δφ is maintained in a constant value state, and the difference angle Δφ between the drum shaft conversion spindle integration angle φs and the detected drum angle φd can be learned with accuracy over the predetermined learning time T from when the difference angle Δφ is maintained as a constant value.

In the shift-down process, by averaging the difference angles Δφ learned over the predetermined learning time T and correcting the control value of the shift motor 61 by the average difference angle obtained by performing the averaging process, it is possible to correct the deviation between the drum center 82 and the shift driven gear 83 when the gear position is set and to accurately control the rotation of the shift drum 80 by the shift motor 61.

In addition, the difference angle Δφ between the drum shaft conversion spindle integration angle φs and the detected drum angle φd may be learned by combining both the shifting process learning of the shift-up process and the shifting process learning of the shift-down process.

At that time, an average (corresponding to −Z described above) of the difference angles Δφ obtained by averaging the difference angle Δφ obtained by the shifting process learning in the shift-up process and the difference angle Δφ obtained by the shifting process learning in the shift-down process is subtracted from the current detected spindle angle, and thereby an ideally corrected detected spindle angle can be obtained.

The drum shaft conversion spindle integration angle φs can be calculated using the corrected detected spindle angle, and the difference angle Δφ between the corrected drum shaft conversion spindle integration angle φs and the detected drum angle φd can be learned with higher accuracy using the corrected drum shaft conversion spindle integration angle φs. In addition, by correcting the control value of the shift motor 61 with the difference angle Δφ, it is possible to correct the deviation between the drum center 82 and the shift driven gear 83 when the gear position is set, and to control the rotation of the shift drum 80 by the shift motor 61 with higher accuracy.

Although the transmission apparatus according to the embodiment of the present invention has been described above, the aspect of the present invention is not limited to the above-described embodiment, and the prevent invention can be embodied in various aspects within the scope of the gist of the present invention.

REFERENCE SIGNS LIST

P power unit
m1 to m6 drive gear
c1 to c6 driven gear
m3, m4, c5, c6 shifter gear
1 motorcycle
3 internal combustion engine
4 transmission apparatus
10 vehicle body frame
11 head pipe
12 main frame
13 center frame
14 seat rail
15 mid-stay
16 down frame
17 front fork
19 steering handlebar
20 pivot shaft
23 rear wheel
24 occupant seat
25 fuel tank
31 crankcase
31U upper crankcase
$31U_L$ left case side wall
$31U_R$ right case side wall
$31U_S$ upper case peripheral wall
31D lower crankcase
$31D_L$ left case side wall
$31D_R$ right case side wall
$31D_S$ lower case peripheral wall
$31D_{SR}$ right rear case peripheral wall portion
32 crankshaft
33 primary drive gear
34 cylinder block
35 cylinder head
36 head cover
37 oil pan
38R right crankcase cover
38L left crankcase cover
40 transmission
41 main shaft
42 counter shaft
43 ball bearing
44 ball bearing
45 ball bearing
46 ball bearing
47 needle bearing
50 gear group
51 dog clutch
52 fork groove
53 clutch mechanism
54 primary driven gear
55 hydraulic circuit
60 variable speed drive mechanism
61 shift motor
62 drive gear
65 gear case cover
70 reduction gear mechanism
71 drive gear
72 first gear shaft
72L large-diameter gear
72S small-diameter gear
73 second gear shaft
73I idle gear
74 spindle driven gear
75 shift spindle
76 shift drive gear
78 spindle angle sensor
80 shift drum
80A drum main body 80v lead groove
80A_R right cylindrical portion
80B drum left shaft portion
80d recess
81 bolt
82 drum center
82a cylindrical portion
82b increased diameter disk portion
82c star-shaped cam
82d driven engagement portion
82e decreased diameter portion
83 shift driven gear
83b hollow disk portion
83c fan-shaped recessed portion
83d drive engagement portion
83e gear teeth
84 needle bearing
85 ball bearing
86 shift fork shaft
87 shift fork
88 neutral switch
89 drum angle sensor
90 stopper mechanism
92 stopper arm
93 stopper roller
100 shift control device

The invention claimed is:

1. A transmission apparatus comprising: a transmission including a plurality of gear pairs having different transmission gear ratios for transmitting power; and a variable speed drive mechanism that changes and shifts the plurality of gear pairs by movement of a shift fork guided by a shift drum when the shift drum is rotated by being driven by a shift motor, wherein the variable speed drive mechanism includes a drum center that is provided at an end portion of the shift drum and is rotated together with the shift drum, a stopper mechanism that positions the drum center at an angular position of each gear position, a shift driven gear that is rotated in synchronization with the shift motor and is disposed to be engageable with the drum center, a shift spindle that is rotated in synchronization with the shift motor and integrally has a shift drive gear that meshes with the shift driven gear at a predetermined reduction ratio, and a configuration in which a drive engagement portion formed in the shift driven gear and a driven engagement portion formed in the drum center are engageable with each other in a circumferential direction with a play angle between the drive engagement portion and the driven engagement portion in the circumferential direction, the variable speed drive mechanism including a drum angle sensor that detects a rotation angle of the shift drum, a spindle angle sensor that detects a rotation angle of the shift spindle, and a shift control device that controls driving of the shift motor based on a control value for rotating the shift driven gear to a target position, and the shift control device corrects and learns the control value based on a difference angle between a drum shaft conversion spindle integration angle obtained by converting a detected spindle angle detected by the spindle angle sensor into a drum angle and a detected drum angle detected by the drum angle sensor, over a predetermined learning time from when the shift motor is driven, and the drive engagement portion of the shift driven gear reduces the play angle to abut on the driven engagement portion of the drum center to accompany the driven engagement portion.

2. The transmission apparatus as claimed in claim 1, wherein the shift control device learns the difference angle between the drum shaft conversion spindle integration angle and the detected drum angle, over a predetermined learning time from a stopped state after the shift motor is further driven in a shift-up direction when the transmission is set in a top gear state, and the drive engagement portion of the shift driven gear reduces the play angle to abut on the driven engagement portion of the drum center to accompany the driven engagement portion.

3. The transmission apparatus as claimed in claim 1, wherein the shift control device learns the difference angle between the drum shaft conversion spindle integration angle and the detected drum angle, over a predetermined learning time from a stopped state after the shift motor is further driven in a shift-down direction when the transmission is set in a neutral state, and the drive engagement portion of the shift driven gear reduces the play angle to abut on the driven engagement portion of the drum center to accompany the driven engagement portion.

4. The transmission apparatus as claimed in claim 1, wherein the shift control device performs
  learning of the difference angle between the drum shaft conversion spindle integration angle and the detected drum angle, over a predetermined learning time from a stopped state after the shift motor is further driven in a shift-up direction when the transmission is set in a top gear state, and the drive engagement portion of the shift driven gear reduces the play angle to abut on the driven engagement portion of the drum center to accompany the driven engagement portion,
  learning of the difference angle between the drum shaft conversion spindle integration angle ($\varphi s$) and the detected drum angle, over a predetermined learning time from a stopped state after the shift motor is further driven in a shift-down direction when the transmission is set in a neutral state, and the drive engagement portion of the shift driven gear reduces the play angle to abut on the driven engagement portion of the drum center to accompany the driven engagement portion, and
  correcting of the drum shaft conversion spindle integration angle based on an average of difference angles obtained by averaging the difference angle learned at the time of shift-up from the top gear state and the difference angle learned at the time of shift-down from the neutral state, and learning of the difference angle between the corrected drum shaft conversion spindle integration angle and the detected drum angle detected by the drum angle sensor.

5. The transmission apparatus as claimed in claim 1, wherein the shift control device learns the difference angle between the drum shaft conversion spindle integration angle and the detected drum angle, over a predetermined learning time from when the shift motor is driven to shift the transmission, and the drive engagement portion of the shift driven gear reduces the play angle to abut on the driven engagement portion of the drum center to accompany the driven engagement portion.

* * * * *